United States Patent
Kasahara

(10) Patent No.: US 6,757,014 B1
(45) Date of Patent: Jun. 29, 2004

(54) VIDEO SIGNAL NOISE REDUCTION APPARATUS, A METHOD OF REDUCING A NOISE IN A VIDEO SIGNAL, AND A RECORDING MEDIUM STORING A PROGRAM OF THE METHOD

(75) Inventor: Misa Kasahara, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/549,339

(22) Filed: Apr. 14, 2000

(30) Foreign Application Priority Data

Jun. 17, 1999 (JP) .......................................... 11-171586

(51) Int. Cl.$^7$ .......................... H04N 5/217; H04N 5/21; G06K 9/40
(52) U.S. Cl. ....................... 348/241; 348/606; 348/607; 382/266
(58) Field of Search ................................ 348/241, 246, 348/247, 607, 606, 619, 627; 375/240.27, 240.29; 714/746, 747; 382/266, 268, 269, 275; 345/611, 612, 616

(56) References Cited

U.S. PATENT DOCUMENTS

| | | | |
|---|---|---|---|
| 5,552,827 A | * | 9/1996 | Maenaka et al. ............ 348/266 |
| 6,526,181 B1 | * | 2/2003 | Smith et al. ................. 382/275 |
| 6,611,287 B1 | * | 8/2003 | Yamamoto et al. ....... 348/222.1 |

FOREIGN PATENT DOCUMENTS

| | | | | |
|---|---|---|---|---|
| EP | 0721286 | 7/1996 | | |
| JP | 6-86104 | 3/1994 | | |
| JP | 11-17954 (Eng Trans) | * 1/1999 | .......... | H04N/1/409 |
| JP | 11-17954 | * 1/1999 | .......... | H04N/1/409 |
| JP | 11-41491 | 2/1999 | | |

* cited by examiner

Primary Examiner—Vu Le
Assistant Examiner—Kelly L. Jerabek
(74) Attorney, Agent, or Firm—Louis Woo

(57) ABSTRACT

A pixel data outputting circuit outputs center and peripheral pixel data from a video signal. A difference calculation circuit calculates differences of the peripheral pixel data from the center pixel data. A correlation pixel data detecting circuit detects a portion of the peripheral data showing high correlation according to the differences and a threshold value. A counter counts the portion of the peripheral data showing high correlation. A selecting circuit responsive to the correlation pixel data detecting circuit selectively outputs a portion of the differences of the portion of the peripheral data. A summing circuit obtains a sum of the portion of the differences in accordance with the counting result. A dividing coefficient generating circuit generates a dividing coefficient of $2^n$ according to the counting result. A dividing circuit divides the sum with the dividing coefficient. An adding circuit adds the dividing result to the center pixel data to generate an output video signal. A weighting circuit weights each of the portion of differences according to the predetermined priority, wherein the summing circuit obtains the sum from the weighted differences. The corresponding method and the corresponding recording medium storing the method are also disclosed.

3 Claims, 6 Drawing Sheets

FIG. 2

| INPUT VAL | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| OUTPUT VAL | 1 | 8 | 8 | 8 | 8 | 8 | 8 | 8 | 16 | 16 | 16 | 16 | 16 | 16 | 16 | 16 |

FIG. 3

| COUNT | ADDING EQs |
|---|---|
| 0 | (A0) |
| 1 | (A0)*4+(A1)*4 |
| 2 | (A0)*3+(A1)+(A2)+(A1+A2)*3/2 |
| 3 | (A0)*2+(A1)+(A2)+(A3)+(A1+A2)*3/2 |
| 4 | (A0)+(A1)+(A2)+(A3)+(A4)+(A1+A2)*3/2 |
| 5 | (A0)+(A1)+(A2)+(A3)+(A4)+(A5)+(A1+A2)*1 |
| 6 | (A0)+(A1)+(A2)+(A3)+(A4)+(A5)+(A6)+(A1+A2)*1/2 |
| 7 | (A0)+(A1)+(A2)+(A3)+(A4)+(A5)+(A6)+(A7) |
| 8 | (A0)+⋯+(A8)+(A1+A2)*7/2 |
| 9 | (A0)+⋯+(A9)+(A1+A2)*3 |
| 10 | (A0)+⋯+(A10)+(A1+A2)*5/2 |
| 11 | (A0)+⋯+(A11)+(A1+A2)*2 |
| 12 | (A0)+⋯+(A12)+(A1+A2)*3/2 |
| 13 | (A0)+⋯+(A13)+(A1+A2)*1 |
| 14 | (A0)+⋯+(A14)+(A1+A2)*1/2 |
| 15 | (A0)+⋯+(A15) |
| 16 | (A1)+⋯+(A16) |

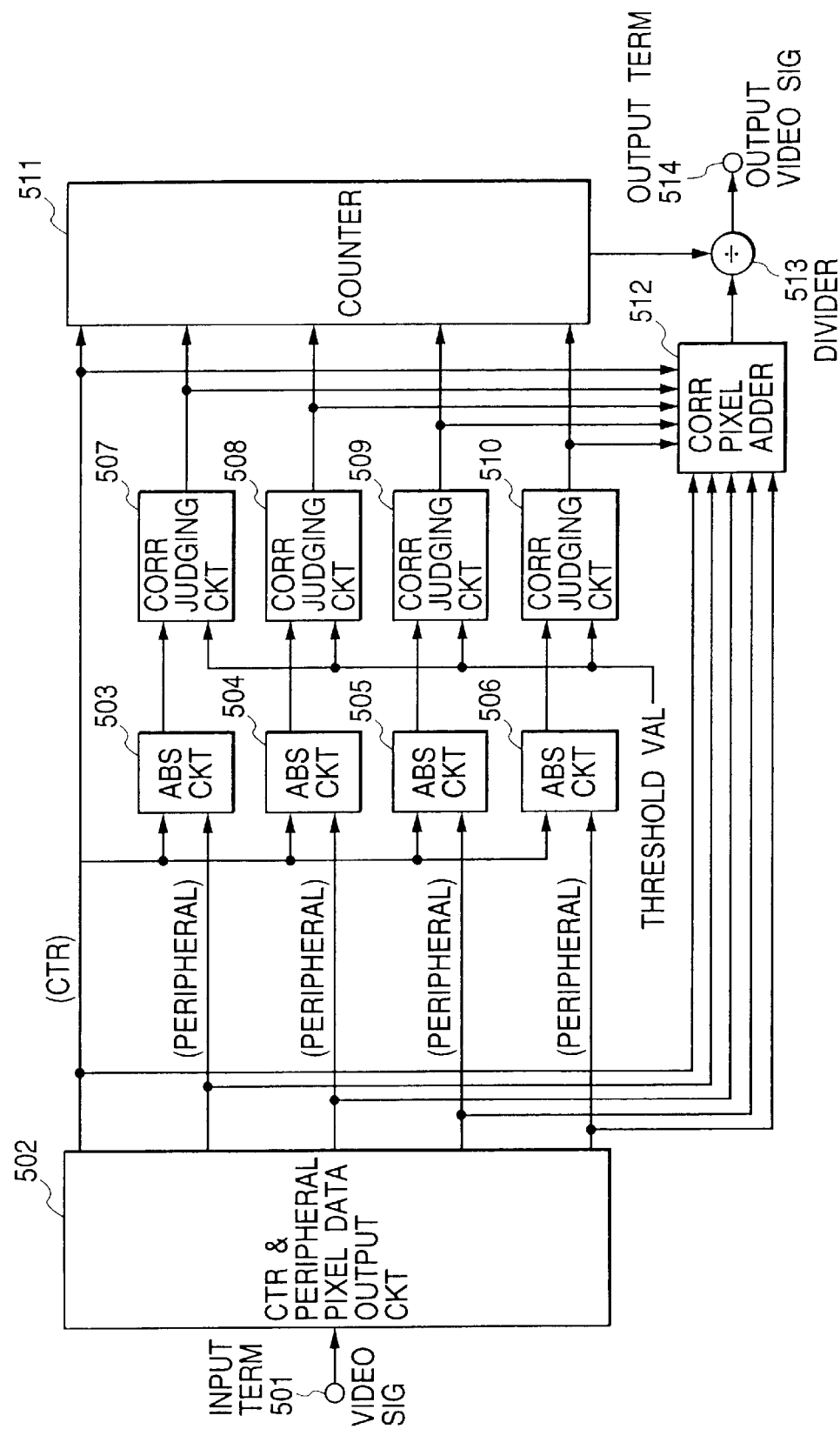

VIDEO SIGNAL NOISE REDUCTION APPARATUS, A METHOD OF REDUCING A NOISE IN A VIDEO SIGNAL, AND A RECORDING MEDIUM STORING A PROGRAM OF THE METHOD

BACKGROUND OF THE INVENTION

1. Field of the Invention

This invention relates to a video signal noise reduction apparatus, a method of reducing a noise in a video signal, and a recording medium storing a program of the method.

2. Description of the Prior Art

A video signal noise reduction apparatus for reducing noise in a video signal by averaging the video signal in accordance with a correlation result between the center and peripheral pixels are known.

Japanese patent application provisional publication No. 6-86104 discloses such a prior art video signal noise reduction apparatus.

FIG. 6 is a block diagram of the prior art video signal noise reduction apparatus disclosed in this Japanese patent provisional application.

A video signal from an input terminal 501 is supplied to a center and peripheral pixel data output circuit 502. The center and peripheral pixel data output circuit 502 supplies center pixel data and peripheral pixel data to absolute value circuits 503 to 506. The absolute value circuits 503 to 506 calculate difference in values of the peripheral pixels from that of the center pixel and operates absolute values which are supplied to a correlation judging circuits 507 to 510. The correlation judging circuits 507 to 510 compare the absolute values from the absolute value circuits 503 to 506 with a threshold value to judge the presence or the absence of correlation. The judging results are supplied to counter 511 and to correlation pixel adder 512. The counter 511 counts the number of the pixels showing correlation and the count is supplied to a divider 513.

The correlation pixel adder 512 obtains a sum of values of only pixels showing correlation. The sum is supplied to the divider 513. The divider 513 divides the sum from the correlation pixel adder 512 by the count from the counter 511 and the dividing result is outputted as the output video signal. Thus, the dividing result replaces the value of the center pixel, so that the video signal is averaged to reduce noise in the video signal.

The divider makes the circuit scale large.

SUMMARY OF THE INVENTION

The aim of the present invention is to provide a superior video signal noise reduction apparatus, a superior method of reducing a noise in a video signal, and a superior recording medium storing a program of the method.

According to the present invention there is provided a video signal noise reduction apparatus. A pixel data outputting circuit responsive to a pixel clock signal outputs data of a center pixel and data of peripheral pixels from a video signal. A difference calculation circuit calculates differences of the data of the peripheral pixels from the data of the center pixel. A correlation pixel data detecting circuit detects a portion of the data of the peripheral pixels showing high correlation with the data of the center pixel in accordance with the differences and a threshold value. A counting circuit counts the portion of the data of the peripheral pixels from the correlation pixel data detecting circuit. A correlation pixel selecting circuit responsive to the correlation pixel data detecting circuit selectively outputs a portion of the differences of the portion of the data of the peripheral pixels. A summing circuit obtains a sum of the portion of the differences in accordance with the counting result. A dividing coefficient generating circuit generates a dividing coefficient of $2^n$ in accordance with the counting result of the counting circuit. A dividing circuit divides the sum with the dividing coefficient. An adding circuit adds the dividing result to the center pixel data to generate an output video signal.

In the video signal noise reduction apparatus, the summing circuit includes a weighting circuit which weights each of the portion of differences in accordance with a predetermined priority, the summing circuit obtains the sum from the weighted differences.

According to the present invention there is also provided a method of reducing noise in a video signal including the steps of: outputting data of a center pixel and data of peripheral pixels from a video signal in response to a pixel clock signal; calculating differences of the data of the peripheral pixels from the data of the center pixel; detecting a portion of the data of the peripheral pixel showing high correlation with the data of the center pixel in accordance with the differences and a threshold value; counting the detected portion of the data of the peripheral pixels; selectively outputting the detected portion of the differences of the portion of the data of the peripheral pixels; obtaining a sum of the portion of the differences in accordance with the counting result; generating a dividing coefficient of $2^n$ in accordance with the counting result; dividing the sum with the dividing coefficient; and adding the dividing result to the data of the center pixel to generate an output video signal.

The method of reducing noise further includes the step of weighting each of the portion of differences in accordance with a predetermined priority. The sum is obtained from the weighted differences.

According to the present invention there is further provided a recording medium comprising: a base; and a recording layer storing a program including the steps of: outputting data of a center pixel and data of peripheral pixels from a video signal in response to a pixel clock signal; calculating differences of the data of said peripheral pixels from the data of the center pixel; detecting a portion of the data of the peripheral pixels showing high correlation with the data of the center pixel in accordance with the differences and a threshold value; counting the detected portion of the data of the peripheral pixels; selectively outputting the detected portion of the differences of the portion of the data of the peripheral pixels; obtaining a sum of the portion of the differences in accordance with the counting result; generating a dividing coefficient of $2^n$ in accordance with the counting result; dividing the sum with the dividing coefficient; and adding the dividing result to the data of the center pixel to generate an output video signal.

The program further includes the step of weighting each of the portion of differences in accordance with a predetermined priority. The sum is obtained from the weighted differences.

BRIEF DESCRIPTION OF THE DRAWINGS

The object and features of the present invention will become more readily apparent from the following detailed description taken in connection with the accompanying drawings in which:

FIG. 2 is a table of the embodiment showing an example of values of the coefficient with respect to the counting result;

FIG. 3 is a table of this embodiment showing weighting and adding equations;

FIG. 6 is a block diagram of the prior art video signal noise reduction apparatus.

The same or corresponding elements or parts are designated with like references throughout the drawings.

DETAILED DESCRIPTION OF THE INVENTION

Hereinbelow will be described an embodiment of this invention.

Figure 1:
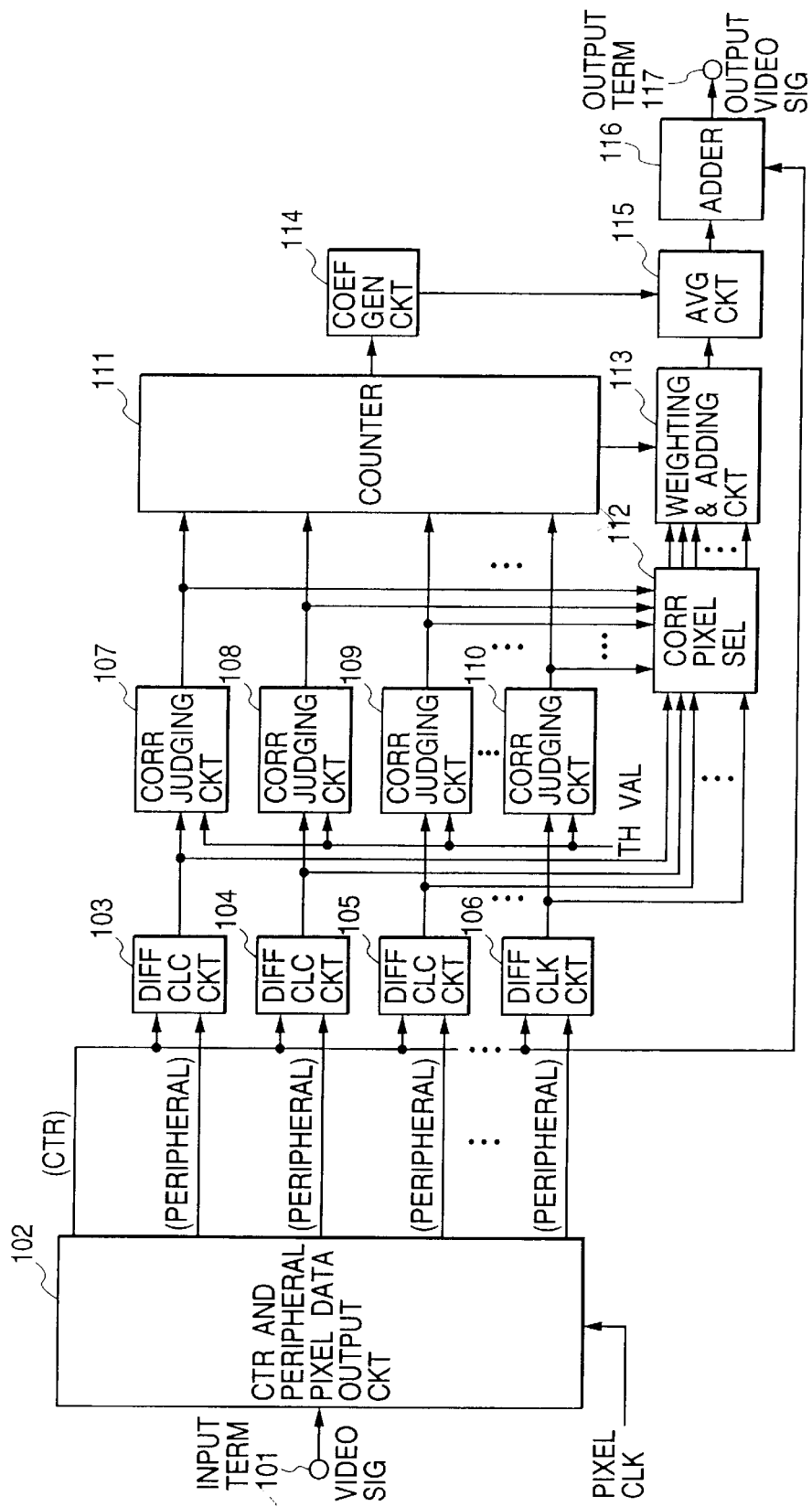
FIG. 1 is a block diagram of a video signal noise reduction apparatus of an embodiment of this invention.

FIG. 1 is a block diagram of a video signal noise reduction apparatus of the embodiment of this invention.

The video signal noise reduction apparatus includes an input terminal 101, a center and peripheral pixel data output circuit 102, difference calculation circuits 103 to 106, a correlation judging circuits 107 to 110, a counter 111, a coefficient generating circuit 114, a correlation pixel selector 112, a weighting and adding circuit 113, an averaging circuit 115, and an adder 116.

A video signal from an input terminal 101 is supplied to a center and peripheral pixel data output circuit 102. The center and peripheral pixel data output circuit 102 supplies center pixel data (data of the center pixel) and peripheral pixel data (data of peripheral pixels) to difference calculation circuits 103 to 106, respectively. More specifically, the center and peripheral pixel data output circuit comprises a memory to output values of the center and peripheral pixels. The difference calculation circuits 103 to 106 calculate differences in values of the peripheral pixels from that of the center pixel, respectively. The differences are supplied to correlation judging circuits 107 to 110, respectively. The correlation judging circuits 107 to 110 compare the differences from the difference calculation circuits 103 to 106 with a threshold value to judge the presence or the absence of correlation, respectively. The judging results are supplied to counter 111 and to correlation pixel selector 112. The counter 111 counts the number of the pixels showing high correlation and the count is supplied to a coefficient generation circuit 114 and to a weighting and adding circuit 113.

The coefficient generation circuit 114 generates a dividing coefficient of $2^n$ in accordance with the counting result of the counter 111. FIG. 2 is a table of the embodiment showing an example of values of the coefficient with respect to the counting result. In FIG. 2, the number of values of pixels inputted to the center and peripheral pixel data output circuit 102 is sixteen.

The correlation pixel selector 112 selectively outputs a portion of differences corresponding to high correlation results. The weighting and adding circuit 113 weights each of the portion of differences from the correlation pixel selector 112 in accordance with one of equations selected in accordance with the count from the counter 111 and adds the weighting results. FIG. 3 is a table of this embodiment showing weighting and adding equations, wherein the number of pixels under processing is sixteen. The coefficients are varied in accordance with a predetermined priority. That is, one of peripheral pixels which is nearest to the center pixel has a high priority. For example, in FIG. 3, the peripheral pixel A1 (for example, the pixel on the right side of the center pixel) has a highest priority other than the center pixel A0. More specifically, it is assumed that priority levels of differences (A0) to (A16) decrease in this order. Therefore, the center pixel has the highest priority but the difference from its own value is always zero, so that the actual highest priority is assigned to one of nearest pixels, for example, the pixel at the right side of the center pixel. Accordingly, the weighting and adding equation is selected in accordance with the counting result and the values of the peripheral pixels are weighted in accordance with the priority and added with each other.

The averaging circuit 115 divides the output of the weighing and adding circuit 113 with the coefficient from the coefficient generation circuit 114. The adder 116 adds the output of the averaging circuit 115 to a value of the center pixel from the center and peripheral pixel data output circuit 102 to generate an output video signal. The averaging circuit 115 includes a bit shift register for shifting the bits of the weighting and adding result because the coefficient is $2^n$.

As mentioned above, a predetermined priority is provided to peripheral pixels and the differences showing high correlation is weighted in accordance with the number of high correlation peripheral pixels and the adding result is divided with the coefficient of $2^n$ determined in accordance with the number of the high correlation peripheral pixels, and the dividing result is added to the value of the center pixel, so that noise in the video signal is suppressed. Moreover the averaging circuit 115 includes the bit shift register, so that the circuit scale can be miniaturized.

Figure 4:
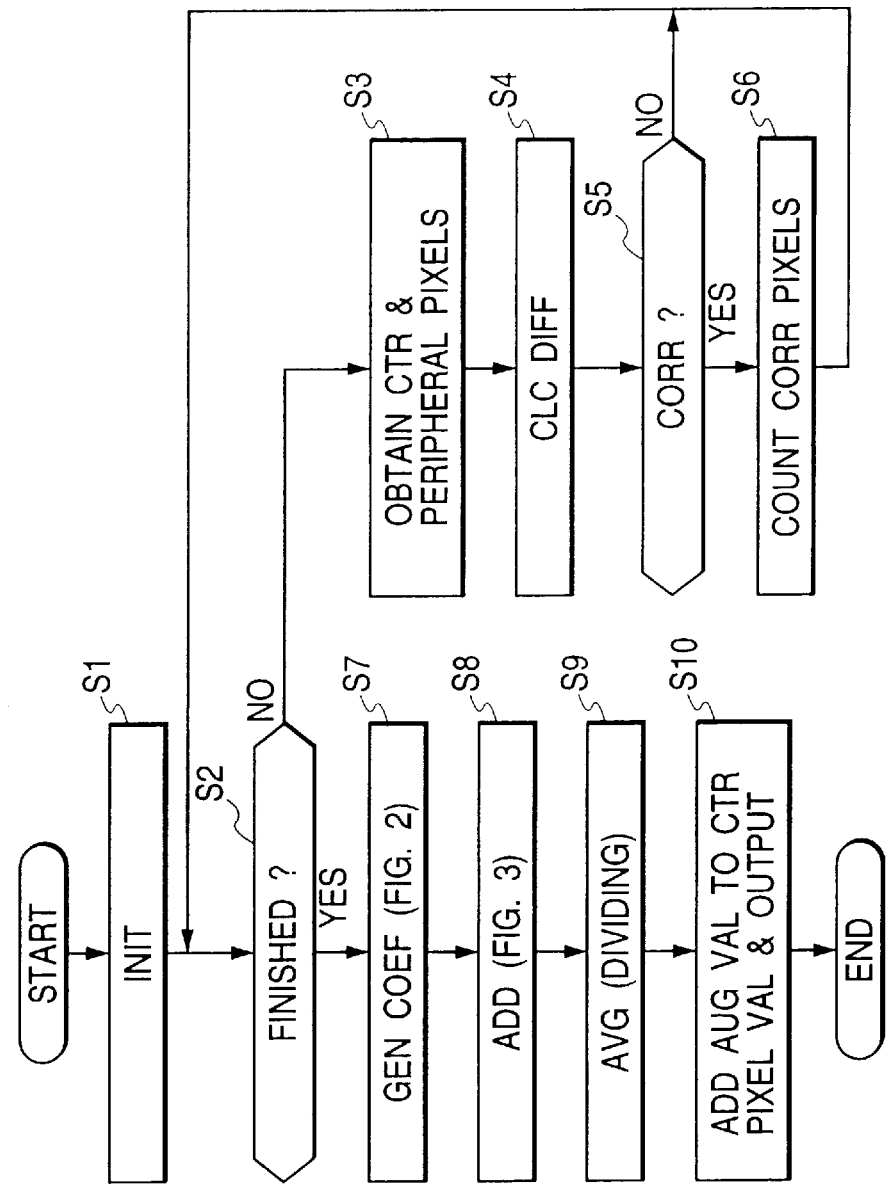
FIG. 4 depicts a flow chart of this embodiment showing a method of reducing noise in the video signal.
Figure 5:
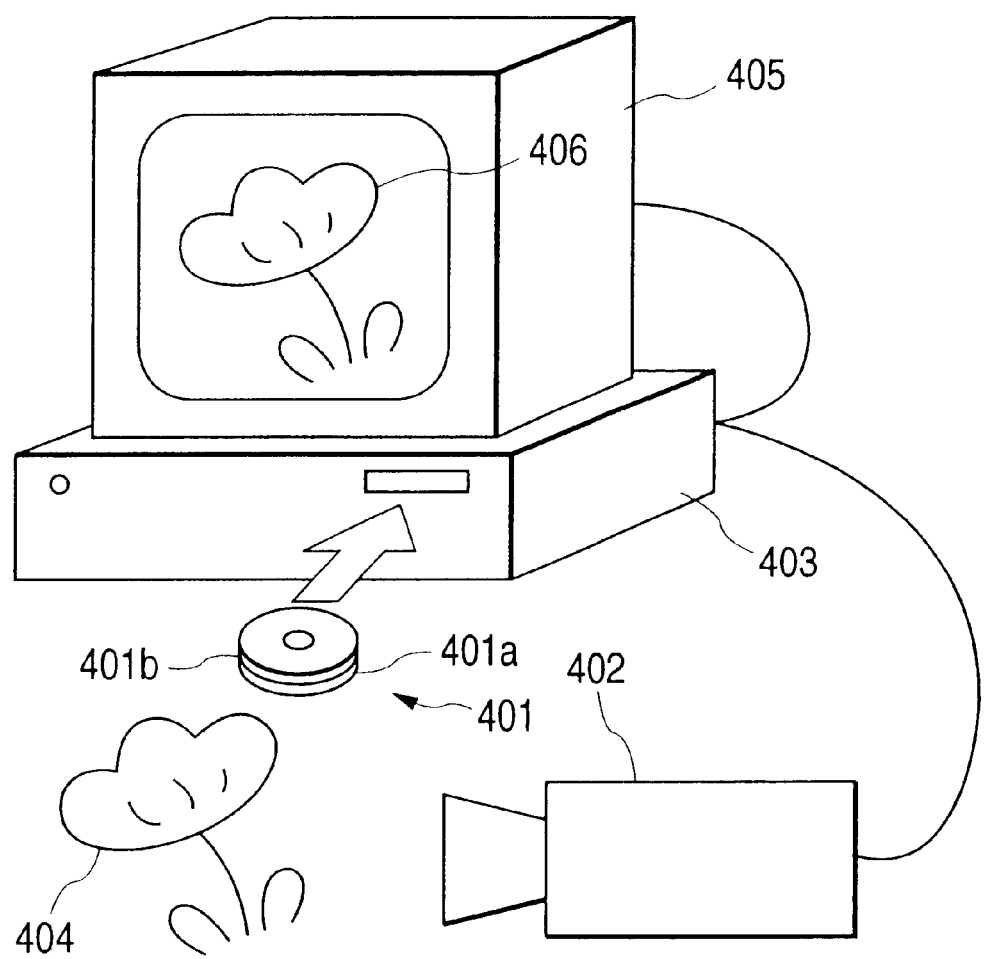
FIG. 5 is an illustration of this embodiment showing a video processing operation.

FIG. 4 depicts a flow chart of this embodiment showing a method of reducing noise in the video signal. FIG. 5 is an illustration of this embodiment showing a video processing operation. A video signal generated by a video camera 403 is processed with the program in the computer 403 and the processed video signal is supplied to a video monitor 405 and the image 406 is reproduced.

In step s1, the count of the peripheral pixels showing the high correlation is initialized. In step s2, it is judged whether reading values of the center pixel and peripheral pixels around the center pixel has finished. If it has not finished, a value of the center pixel or one of peripheral pixels is obtained (read) in step s3. In the following step s4, a difference between a value of the center pixel and a value of the peripheral pixel is calculated. In the following step s5, the difference is compared with the threshold value. If the difference is greater than the threshold value (high correlation), the count is incremented in step s6 and processing returns to step s2. If the difference is not greater than the threshold value (low correlation) in step s5 processing directly returns to step s2.

If all values of the center and peripheral pixels have been read and outputted in step s2, the coefficient is generated in accordance with the count obtained in step s6 as shown in FIG. 2.

In the following step s8, the differences are weighted and added in accordance with one of weighting and adding equations selected in accordance with the count.

In step s9, the weighting and adding result is divided with the coefficient obtained in step s7 for averaging.

In step s10, the averaging result is added to the value of the center pixel to generates an output video signal.

Actually, in step s9, dividing the weighting and adding result is effected by shifting the bits of the weighting and adding result because the coefficient is $2^n$.

In FIG. 5, the program representing the operation of the above-mentioned method is stored in a recording medium 401. The recording medium 401 includes a base 401a and a recording layer 401b. The recording layer 401b stores the program including the following steps:

Center and peripheral pixel data are outputted from a video signal in response to a pixel clock signal.

Differences of the peripheral pixel data from the center pixel data are calculated.

A portion of the peripheral data showing high correlation with the center pixel data is detected in accordance with the differences and a threshold value.

The detected portion of the peripheral data are counted.

The detected portion of the differences are selectively outputted.

A sum of the portion of the differences is obtained with weighting in accordance with the counting result.

A dividing coefficient of $2^n$ is obtained in accordance with counting result.

The sum is divided with the dividing coefficient.

The dividing result is added to the center pixel data to generate an output video signal.

The recording medium 401 is put into a recording medium reader in a computer 403 and stored in the memory, so that a video signal generated by a video camera 403 is processed with the program in the computer 403 and the processed video signal is supplied to the video monitor 405 and the image 406 is reproduced.

What is claimed is:

1. A video signal noise reduction apparatus comprising:
   pixel data outputting circuit responsive to a pixel clock signal for outputting data of a center pixel and data of peripheral pixels from a video signal;
   difference calculation means for calculating differences of said data of said peripheral pixels from said data of said center pixel;
   correlation pixel data detecting means for detecting a portion of said data of said peripheral pixels showing high correlation with said data of said center pixel in accordance with said differences and a threshold value;
   counting means for counting said detected portion of said data of said peripheral pixels from said correlation pixel data detecting means;
   correlation pixel selecting means responsive to said correlation pixel data detecting means for selectively outputting a portion of said differences of said portion of said data of said peripheral pixels;
   summing means for obtaining a sum of said portion of said differences in accordance with said counting result;
   dividing coefficient generating means for generating a dividing coefficient of $2^n$ in accordance with said counting result of said counting means;
   dividing means for dividing said sum with said dividing coefficient; and adding means for adding said dividing result to said data of said center pixel to generate an output video signal;
   wherein said summing means includes weighting means for weighting each of said portion of differences in accordance with a predetermined priority and said summing means obtains said sum from said weighted differences.

2. A method of reducing noise in a video signal comprising the steps of:
   outputting data of a center pixel and data of peripheral pixels from a video signal in response to a pixel clock signal;
   calculating differences of said data of said peripheral pixels from said data of said center pixel;
   detecting a portion of said data of peripheral pixels showing high correlation with said data of said center pixel in accordance with said differences and a threshold value;
   counting said detected portion of said peripheral data;
   selectively outputting said detected portion of said differences of said portion of said data of said peripheral pixel;
   obtaining a sum of said portion of said differences in accordance with said counting result;
   generating a dividing coefficient of $2^n$ in accordance with counting result;
   dividing said sum with said dividing coefficient; and
   adding said dividing result to said data of said center pixel to generate an output video signals;
   said method further comprising the step of weighting each of said portion of differences in accordance with a predetermined priority, wherein said sum is obtained from said weighted differences.

3. A recording medium comprising:
   a base; and
   a recording layer storing a program including the steps of:
      outputting data of a center pixel and data of peripheral pixels from a video signal in response to a pixel clock signal;
      calculating differences of said data of said peripheral pixels from said data of said center pixel;
      detecting a portion of said data of said peripheral pixels showing high correlation with said data of said center pixel in accordance with said differences and a threshold value:
      counting said detected portion of said data of said peripheral pixels;
      selectively outputting said detected portion of said differences of said portion of said data of said peripheral pixels;
      obtaining a sum of said portion of said differences in accordance with said counting result;
      generating a dividing coefficient of $2^n$ in accordance with counting result;
      dividing said sum with said dividing coefficient: and
      adding said dividing result to said data of said center pixel to generate an output video signal;
      wherein said program further comprising the step of weighting each of said portion of differences in accordance with a predetermined priority, wherein said sum is obtained from said weighted differences.

* * * * *